Oct. 19, 1926. 1,603,980
C. J. PILLIOD
LOCOMOTIVE CONTROL
Filed August 7, 1920 2 Sheets-Sheet 1
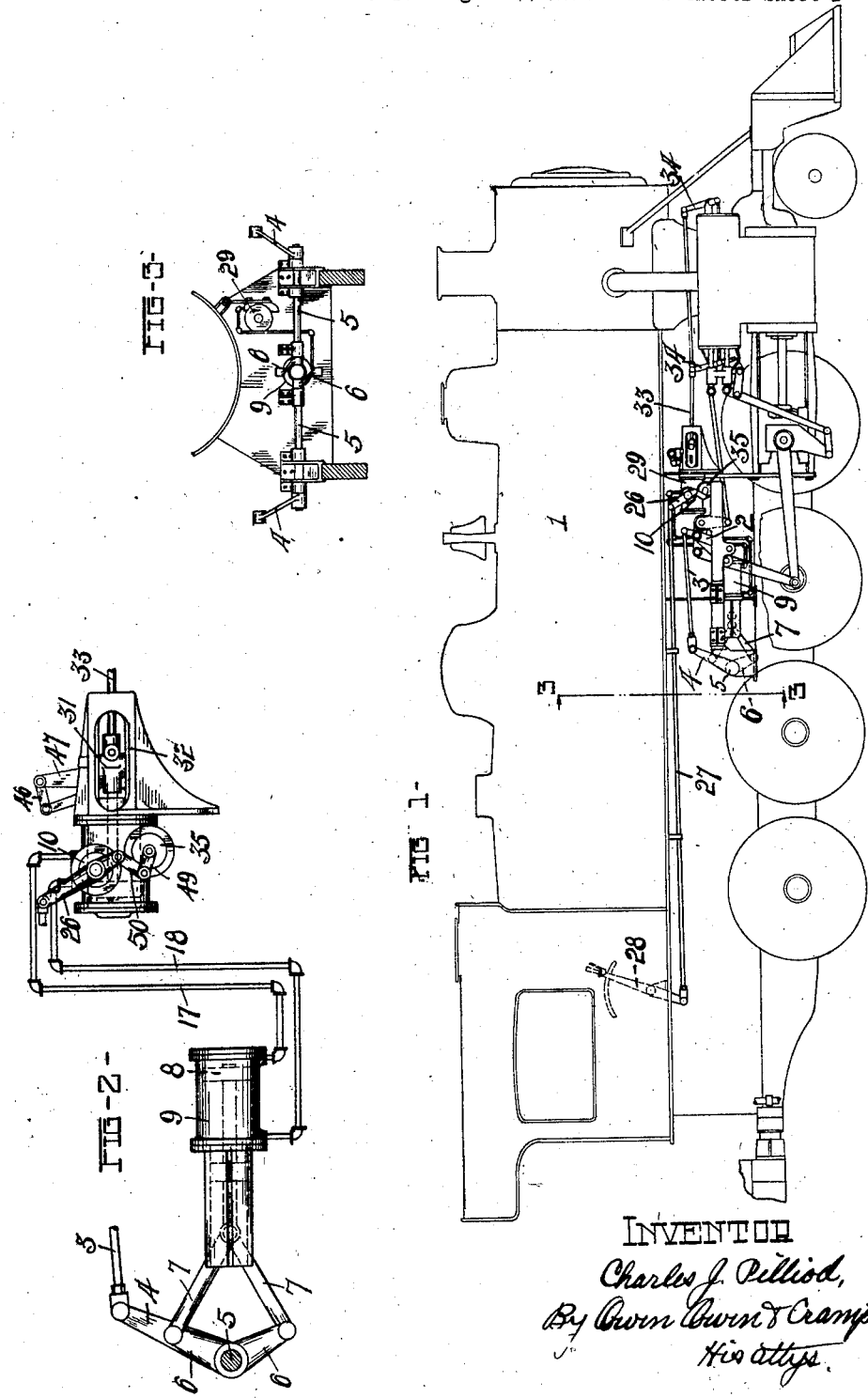
INVENTOR
Charles J. Pilliod,
By Owen Owen & Crampton.
His attys.

Oct. 19, 1926.
C. J. PILLIOD
1,603,980
LOCOMOTIVE CONTROL
Filed August 7, 1920    2 Sheets-Sheet 2
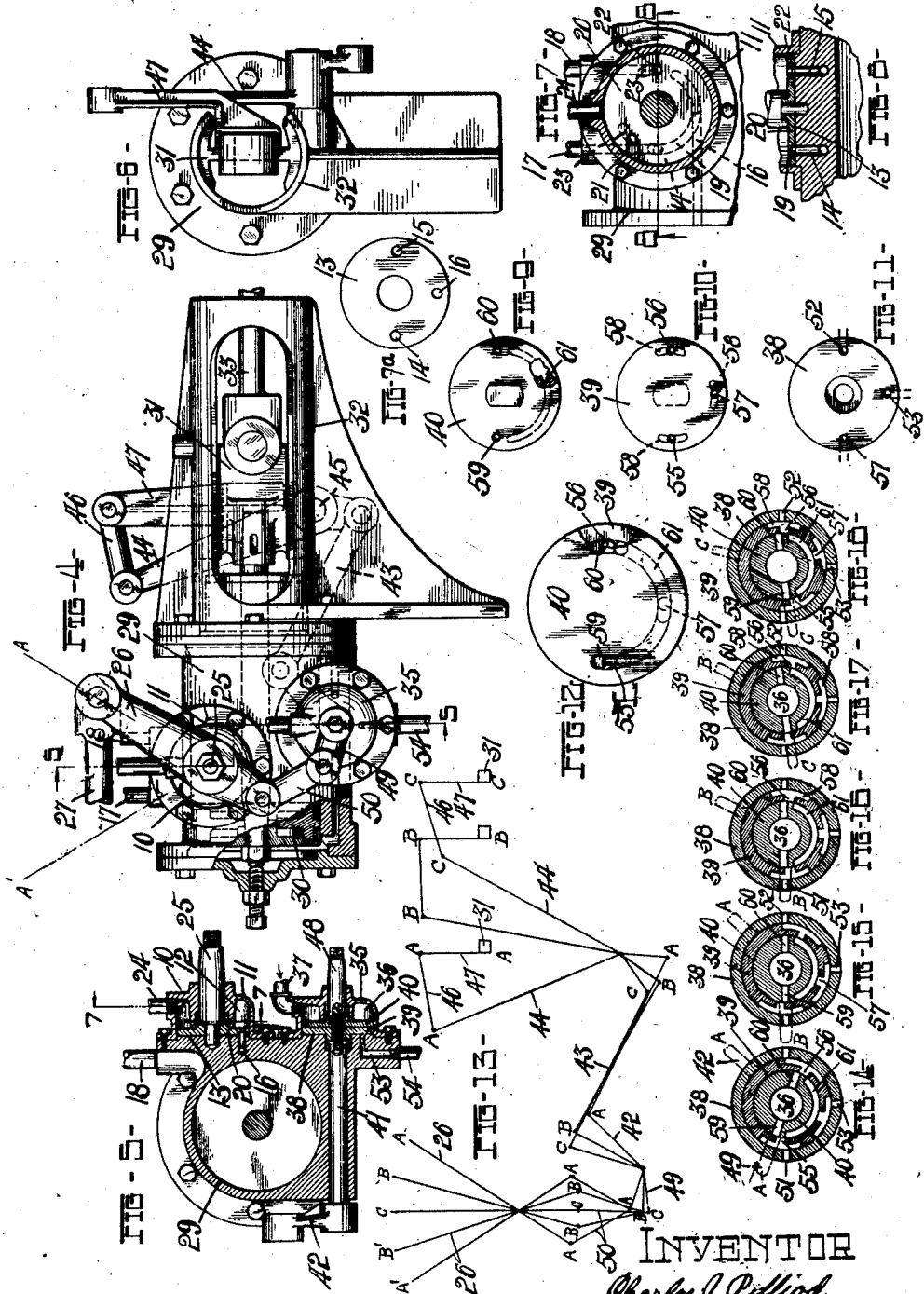
INVENTOR
Charles J. Pilliod,
By Owen Owen & Crampton,
His attys.

Patented Oct. 19, 1926.

1,603,980

UNITED STATES PATENT OFFICE.

CHARLES J. PILLIOD, OF TOLEDO, OHIO, ASSIGNOR TO DANIEL SEARLES, TRUSTEE, OF TOLEDO, OHIO.

LOCOMOTIVE CONTROL.

Application filed August 7, 1920. Serial No. 401,881.

This invention relates to means for controlling the forward and reverse variable speed running of locomotives, and has for its primary object the provision of simple and efficient means of this character including a cylinder in which the fluid operating pressure is balanced or equalized on opposite sides of the piston therein so that the piston is freed from being moved by the fluid pressure in any running or neutral position, thereby preventing a possibility of the movement of the control means from a set running or neutral position except by manual manipulation of the control by the operator.

Further objects and advantages of the invention will be apparent from the following detailed description thereof.

While the invention, in its broader aspect, is capable of embodiment in numerous forms, an embodiment thereof adapted more particularly for use in connection with a constant travel valve gear having a variable travel cut-off sleeve, such for instance as disclosed in my Patent No. 1,414,152, issued April 25, 1922, filed December 18, 1917, is illustrated in the accompanying drawings, in which,—

Figure 1 is a side elevation of a locomotive equipped with the invention in connection with the engine cut-off sleeves and reversing means. Fig. 2 is an enlarged side elevation of the control means embodying the invention and in connection with the reversing means operating cylinder. Fig. 3 is a fragmentary cross-section on the line 3—3 in Fig. 1. Fig. 4 is an enlarged side elevation of the cut-off control means of the invention with parts broken away. Fig. 5 is a cross section on the line 5—5 in Fig. 4, with parts removed. Fig. 6 is an end elevation of a portion of the control means shown in Fig. 4. Fig. 7 is a fragmentary section on the line 7—7 in Fig. 5, showing the reversing cylinder control valve. Fig. 7ª is a face view of the reversing valve seat. Fig. 8 is a section on the line 8—8 in Fig. 7. Fig. 9 is an outer face view of the manually-controlled member of the cut-off valve. Fig. 10 is a similar view of the automatically controlled member of the cut-off valve. Fig. 11 is a face view of the stationary valve seat for the automatic member of the cut-off valve. Fig. 12 is an enlarged outer face view of the manually controlled member of the cut-off valve in balanced or neutralized relation to the automatic member of such valve, the ports of the latter being shown in dotted lines. Fig. 13 is a chart diagram of the relative positions of the operating parts for the reverse valve and the cut-off valve, and Figs. 14, 15, 16, 17 and 18 are diagrammatical views of the cut-off valve with the members thereof in different positions of adjustment indicated in the diagram in Fig. 13.

Referring to the drawings, 1 designates a locomotive equipped with a cross-head connected valve gear and with sleeve valve engines of the type disclosed in my said former application. In the valve gear illustrated, 2 designates the reverse yoke of the standard Marshal valve gear type, and this is connected by a reach-rod 3 to a rocker-arm 4 on the adjacent one of a pair of axially aligned tumbling shafts 5, 5, journaled crosswise of the locomotive and each carrying a rocker-arm 6 at its inner end. Separate links 7 connect the respective rocker-arms 6 with the piston-rod of a piston 8 mounted for travel in the reversing cylinder 9, as is well understood in the art. It is not thought necessary to describe in further detail the valve gear illustrated as the valve gear itself has no bearing on the operation or construction of the control valve comprising this invention as any type of motion reversing means may be employed.

The admission and exhaust of air or other suitable operating fluid to and from the reversing cylinder 9 is controlled through a valve 10, the movable valve member of which is under the control of the engineer in the cab of the locomotive. This valve comprises a valve casing 11 forming a fluid chamber 12 (Fig. 5) having on one side thereof a circular valve seat 13 with three fluid passages 14, 15 and 16 leading therefrom. The passages 14 and 15 have communication with opposite ends of the cylinder 9 through pipes 17 and 18, respectively, so that they alternately act as admission and exhaust passages for the reversing cylinder. The passage 16 serves as the main exhaust port and is connected to first one and then the other of the passages 14 and 15 through a segmental groove 19 in the inner face of a valve disk 20 that is mounted for rotary movements in the fluid chamber 12 and rests against the valve seat 13. The valve disk 20 has ports 21 and 22 therethrough in adjacent spaced relation to the ends of the groove 19, and each port has a segmental groove 23 extending for a distance therefrom in opposition to the adjacent end of the groove 19, as illustrated by dotted lines in Fig. 7. When the valve disk 20 is at the extreme of its movement in counter-clockwise direction the port 21 will have moved downward past the passage 14 and the other end of the groove 23 for said port will be in register with said passage, thereby permitting live fluid to pass from the chamber 12 through the port 21 and groove 23 to the passage 14 and thence through the pipe 17 to the respective end of the cylinder 9 to force the piston 8 away from such end of the cylinder. The exhaust from the opposite end of the cylinder 9 will take place through the pipe 18, casing passage 15, valve groove 19 and exhaust passage 16, the groove 19 being then in position to open communication between the passages 15 and 16. The admission and exhaust of fluid to and from the reversing cylinder 9 in this manner may take place throughout a range of movement of the valve disk 20 in either direction that is determined by the length of the groove 23. A reverse of this operation takes place when the valve disk is moved to place the port 22 or its groove 23 in register with the casing passage 15, which is the position shown in Fig. 7, and in which position the exhaust groove 19 in the valve disk opens communication between the casing passage 14 and exhaust passage 16. Live fluid is admitted to the valve chamber 12 through a pipe 24 having communication with any suitable source of supply. The valve disk 20 has a stem 25 projecting axially therefrom without the casing 11 (Fig. 5) and this stem carries a lever 26, the outer end of which is connected by a reach-rod 27 to the engineer's control lever 28 located in the locomotive cab, or at any other suitable point of access.

The cut-off control means, in its present embodiment, comprises a cylinder 29 having a piston 30 working therein, the piston rod of which is connected without one end of the cylinder to a cross-head 31 operating in a guide 32, and this cross-head is connected by a rod 33 to the controlling levers 34 of the cut-off sleeves of the respective engine.

The control valve for the cut-off cylinder comprises a valve casing 35 fixed to the cylinder 29 and forming a fluid chamber 36 to which live fluid, preferably but not necessarily air, is admitted through a pipe 37 from any suitable source of supply. The cylinder side of the chamber 36 is provided with a circular seat 38 against which an automatically controlled valve disk 39 seats, and seating against the opposite or valve chamber side of this disk is a manually controlled valve disk 40. The disk 39 is connected at its seat side to a rocker-shaft 41 to rotate therewith, said shaft being journaled in the bottom portion of the cylinder casing transversely thereof and carrying an arm 42 at its outer end. This arm is connected by a link 43 to the lower short arm of a lever 44, which is fulcrumed to the cross-head guide 32 at one side thereof, as at 45, and has its longer arm connected by a link 46 to a member 47 which fixedly rises from one side of the cross-head 31 and moves with said crosshead. It is thus evident that movements of the cross-head 31 will impart predetermined rocking movements to the valve disk 39.

The manually operated valve disk 40 has a stem 48 projecting axially therefrom through the valve casing 35 and provided at its outer end with an arm 49, connected by a link 50, in the present instance, to the lower end of the lever 26, which operates the reversing valve, the connection being such that the arm 49 will stand in the position shown in Fig. 4 when the lever 26 is in either of its two extreme positions of throw. It is therefore evident that the engineer has a unitary control for both the reversing valve and the cut-off valve and to accommodate such arrangement the reversing valve is mounted on the casing of the cylinder 29, in the present instance above the cut-off valve. It is apparent that while I have shown the engineer's control of the cut-off valve as being through the control or operating means of the reversing valve, the use of the cut-off valve is not limited to this arrangement as it may be used separately from the reversing valve and in such case placed in direct connection with the engineer's control lever instead of through the operating means for the reversing valve, or the same control means may be used with the reversing valve eliminated therefrom.

The cut-off valve seat 38 (Fig. 11) is provided with three passages 51, 52 and 53, arranged in the present instance at substantially 90 degrees apart, with the passages 51 and 52 in communication with opposite ends of the cylinder 29 and with the passage 53 forming a main exhaust and leading to the atmosphere through a pipe 54.

The automatic valve disk 39 (Fig. 10) is provided with three ports 55, 56 and 57 arranged to simultaneously register with the seat pasages 51, 52 and 53, respectively. A segmental groove 58 is provided in the seat side of the valve disk 39 for each port therein and extends at opposite sides of the respective port in concentric relation to the valve axis to permit the valve ports to remain in constant communication with the respective seat passages 51, 52 and 53 during the complete range of movement thereof by the cross-head 31.

The manually controlled valve disk 40 seats against the fluid chamber side of the valve disk 39 and is provided at opposite sides of its center with ports 59 and 60 and between these ports on its inner face with a segmental groove 61, concentric to the valve axis and terminating at its opposite ends adjacent to the respective ports, as shown in Fig. 9. The ports 59 and 60 are so positioned with respect to the ports 55 and 56 of the automatic valve member 39 that when the valve members are in their "balanced" position the lower edge portions of the ports 59 and 60 will overlap the upper edge portions of the ports 55 and 56, respectively, thereby connecting the fluid chamber 36 of the cut-off valve with both ends of the cylinder 29 so that the pressure on both sides of the piston 30 is balanced or equalized. This overlapping of the ports when the valve members are in their balanced position is illustrated in Fig. 12. In this position of the valves the ends of the exhaust groove 61 in the valve member 40 stop just short of communication with the respective ports 55, 56 in the valve member 39. It is thus evident that a manual movement of the valve member 40 in clockwise direction will throw the port 60 into full open communication with the port 56, thereby admitting full pressure of fluid to the right end of the piston 30, and will move the port 59 out of register with the port 55 and at the same time throw the exhaust groove 61 into communication with the port 55 so that exhaust may take place from the left end of the cut-off cylinder, such exhaust passing to the atmosphere from the groove 61 through the port 57 in the valve 39 and thence through the casing passage 53 and pipe 54. It is evident that the admission of fluid to one side and the exhaust of fluid from the other side of the piston 30 will cause a movement of the piston in the direction of exhaust and thereby move the cross-head 31, which in turn communicates an automatic movement of the valve disk 39 sufficient to catch up with the manual movement which was imparted to the disk 40, thereby again placing the ports 55 and 56 in register with the respective ports 59 and 60 and cut off the exhaust so that the piston is balanced and automatically locked by fluid pressure in the position to which moved.

The range of movement of both the crosshead and valve levers is shown diagrammatically in Fig. 13 in which the extreme positions of the lever 26 are designated A and A′, the neutral position is designated C, and the intermediate positions are designated B and B′. In either position A, A′ of the lever 26 the position of the manually controlled rocker arm 49 of the cut-off valve 35 will be A, while its position will be B for either position B, B′ of the lever 26, and will be C for the neutral position C of said lever. The automatic movement through the cross-head 31 of the valve member 39 is also indicated in this diagram, the letters A on the members 42, 43, 44, 46 and 47 designating the positions which said parts take when the lever 26 is in either of its positions A, A′. Likewise the positions B of the several automatically moved members designate the positions of such members when the lever 26 is in either of the positions B, B′ of its movement, and the positions C of the automatically moved members designate the positions which they assume when the lever 26 is in its neutral position C.

The different positions of the members of the automatic valve 35 for the different positions of movement of the lever 26 are illustrated diagrammatically in Figs. 14 to 18 in which the outer casing designates the valve seat 38, the intermediate casing, the automatic valve member 39 to which the arm 42 is connected, and the inner casing the manually controlled valve member 40 to which the arm 49 is connected. When the lever 26 is in the position A (Figs. 4 and 13) the valve parts will have the relation shown in Fig. 14 in which relation the passages 51 and 52 leading to the ends of the cut-off cylinder are both closed to the exhaust passage 53 and the ports 59, 60 in the manually operated valve member 40 are in partial overlapping relation to each of the ports 55, 56 in the valve member 39, which in turn are in communication with the opposite cylinder ends, thereby balancing the pressure on opposite sides of the piston. Upon a movement of the lever 26, for instance, to B position, the valve member 40 will be manually moved to continue the open communication of the left end of the cylinder with the live fluid chamber 36 of the valve and to close the right end of the cylinder to such chamber and open such end to the exhaust passage, as illustrated in Fig. 15, in which it will be noted that the ports 59 and 55 and cylinder passage 51 are in register and the cylinder passage 52, port 56, exhaust groove 61, port 57 and passage 53 are in register. This causes a movement of the piston 30 to the right until the automatic movement of the valve member 39 by the cross-head 31 has again closed the exhaust passage and brought both ports 55 and 56 of the valve member 39 in register with the ports 59 and 60, as illustrated in Fig. 16, to equalize the pressure on both sides of the piston 30 and thereby lock it against further movement. Upon a further movement of the lever 26, for instance, to C or neutral position, the ports 59 and 60 will again be advanced to change the communicating relation of the ports 59 and 55 with the left cylinder end and to close the connection between the ports 60 and 56 and open the right end of the cylinder to the exhaust, as illustrated in Fig. 17. The movement of the piston, which is occasioned by this change of position of the lever 26, imparts a further automatic movement to the valve member 39 to again place its ports 55 and 56 in neutralizing relation to the ports 59 and 60 of the valve member 40 and to close the exhaust, as illustrated in Fig. 18. It is evident that upon a further movement of the lever 26, for instance, to its B' position and then to its A' position, the movement of the manually controlled valve member 40 will be reversed from that above described so that the valve parts will, upon successive movements of the lever, take the positions illustrated successively in Figs. 17, 16, 15 and 14, or in other words, the operation of the valve parts during the movement of the lever from C to A' positions is just the reverse to the operation of such parts during a movement of the lever from its A to C positions.

The reverse cylinder 9, being controlled by the valve 10, has its piston moved from one end of the cylinder to the opposite end upon manual movement of lever 26 from position A to A' (Fig. 13), the position C of said lever arranging the valve 10 so as to hold the piston in neutral position.

It is evident that I have provided a cut-off control which is semi-automatic in its operation, in that upon a manual movement of the control, the cut-off piston is moved to a predetermined point of its stroke and then automatically arrested by equalizing the fluid pressure on opposite sides of the piston. This equalization of pressures does not permit a creeping of the cut-off piston in one direction or the other from its neutral position by reason of fluid leakage, and therefore does not require the attention of the engineer to frequently adjust the control lever to compensate for leakage and the consequent creeping movement of the cut-off, an objection common with cut-offs heretofore employed, so far as I am aware. It is also evident that while for convenience I have, in the present embodiment of the invention, shown the cut-off valve and the reversing valve as operated by a single operating means, either may be used separately from the other without departing from the scope of the invention, which resides primarily in the cut-off control.

I wish it understood that the invention is not limited to any specific construction, arrangement or form of the parts, as it is capable of numerous modifications and changes without departing from the spirit of the claims.

Having thus described my invention, what I claim as new, and desire to secure by Letters Patent, is,—

1. In combination in a locomotive, a reversing cylinder and a piston therein, a cut-off cylinder and a piston therein, a rotary valve for controlling the admission and exhaust of fluid to and from the reversing cylinder, a multiple part cut-off valve for controlling the admission and exhaust of fluid to and from the cut-off cylinder, a control lever connected to the reversing valve for operating the same, separate rocker arms connected to separate parts of the cut-off valve, connection between one of said arms and the control lever to cause them to have movements in unison, and a connection between the other of said arms and the cut-off piston to cause them to have movements in unison whereby a movement of the manually controlled part of the cut-off valve will open the exhaust at one end and the fluid admission at the other end of the cut-off cylinder and the piston operated part of the cut-off valve will then be automatically moved to open the fluid admission to both ends of the cylinder and close the exhaust when the piston has moved a predetermined extent.

2. The combination in a locomotive, of a reversing cylinder and a piston therein, a cut-off cylinder and a piston therein, a valve mounted on the cut-off cylinder and connected to the reversing cylinder for controlling the admission and exhaust of fluid to and from said reversing cylinder, a lever for operating said valve, a two-part valve for controlling the admission and exhaust of fluid to and from said cut-off cylinder, means connecting one part of said cut-off valve to said lever for effecting movement of the first valve and said valve part in unison, and means for operating the companion valve part of said cut-off valve by and during movement of said cut-off piston to bring said companion valve part into normal relation with said first valve part after the latter has been moved from such normal relation by the adjustment of said first valve, said valve parts when in their normal position equalizing the pressures on the opposite sides of said cut-off piston within said cut-off cylinder.

3. The combination in a locomotive, of a reversing cylinder and a piston therein, a cut-off cylinder and a piston therein, a valve mounted on the cut-off cylinder and connected to the reversing cylinder for controlling the admission and exhaust of fluid to and from said reversing cylinder, a lever for operating said valve, a two-part valve for controlling the admission and exhaust of fluid to and from said cut-off cylinder, means connecting one part of said cut-off valve to said lever for effecting movement of the first valve and said valve part in unison, a cross head connected to the cut-off piston, a guide for the cross head extending from the cut-off cylinder, a rocker lever pivoted on the guide and rockable by said cross-head, and a connection between said rocker lever and the companion valve part for bringing the same into pressure-equalizing relation with said first valve part.

In testimony whereof I have hereunto signed my name to this specification.

CHARLES J. PILLIOD.